(12) United States Patent
Pichler et al.

(10) Patent No.: US 11,164,062 B2
(45) Date of Patent: Nov. 2, 2021

(54) RFID TRANSPONDER AND METHOD OF OPERATING AN RFID TRANSPONDER

(71) Applicant: NXP B.V., Eindhoven (NL)

(72) Inventors: Thomas Pichler, Graz (AT); Ivan Jesus Rebollo Pimentel, Graz (AT); Stefan Maier, Graz (AT); Egas Carvalho Henes Neto, Graz (AT); Harcharan Singh Madaan, Graz (AT); Slawomir Rafal Malinowski, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/065,582

(22) Filed: Oct. 8, 2020

(65) Prior Publication Data

US 2021/0133526 A1 May 6, 2021

(30) Foreign Application Priority Data

Nov. 1, 2019 (EP) .................................... 19206721

(51) Int. Cl.
  *G06K 19/07* (2006.01)
(52) U.S. Cl.
  CPC ..... *G06K 19/0723* (2013.01); *G06K 19/0715* (2013.01)
(58) Field of Classification Search
  CPC .................. G06K 19/0723; G06K 19/0715
  USPC ....................................................... 235/492
  See application file for complete search history.

(56) References Cited

U.S. PATENT DOCUMENTS

| 7,990,249 B1 | 8/2011 | Hyde et al. |
| 8,500,033 B2 | 8/2013 | Almond et al. |
| 9,197,059 B2* | 11/2015 | Wilson ................. H04B 5/0037 |
| 9,569,648 B2 | 12/2017 | Rezayee |
| 2003/0183699 A1 | 10/2003 | Masui |
| 2005/0052279 A1 | 3/2005 | Bridgelall |
| 2005/0140457 A1* | 6/2005 | Bellantoni ........... G06K 7/0008 332/106 |
| 2008/0180224 A1 | 7/2008 | Klapf et al. |
| 2012/0062330 A1* | 3/2012 | Penn ........................ H04B 1/40 332/105 |
| 2012/0249197 A1* | 10/2012 | Rehm .................. H03B 5/1218 327/156 |
| 2017/0061172 A1 | 3/2017 | Quek et al. |
| 2018/0287507 A1* | 10/2018 | Yamada ................ H02M 7/217 |

FOREIGN PATENT DOCUMENTS

| CA | 2503407 A1 | 3/2005 |
| EP | 3416088 A1 | 12/2018 |

* cited by examiner

*Primary Examiner* — Michael G Lee
*Assistant Examiner* — David Tardif

(57) ABSTRACT

In accordance with a first aspect of the present disclosure, a radio frequency identification (RFID) transponder is provided, comprising a modulator and a controller, wherein: the modulator is configured to generate a modulated signal to be transmitted to an external RFID reader; the controller is configured to regulate an input voltage for the modulator, resulting in a regulated input voltage, and to feed said regulated input voltage to the modulator. In accordance with a second aspect of the present disclosure, a corresponding method of operating a radio frequency identification (RFID) transponder is provided.

11 Claims, 10 Drawing Sheets

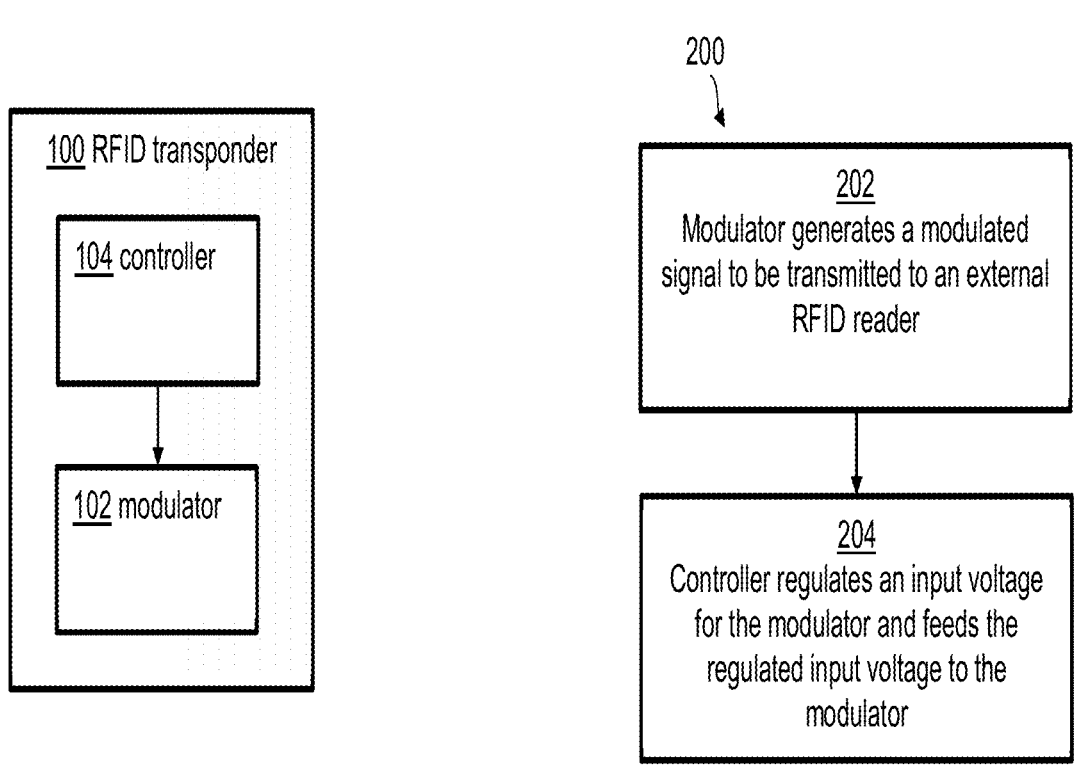

US 11,164,062 B2

RFID TRANSPONDER AND METHOD OF OPERATING AN RFID TRANSPONDER

CROSS-REFERENCE TO RELATED APPLICATIONS

This application claims priority under 35 U.S.C. § 119 to European Patent Application No. 19206721.3, filed on Nov. 1, 2019, the contents of which are incorporated by reference herein.

TECHNICAL FIELD

The present disclosure relates to a radio frequency identification transponder. Furthermore, the present disclosure relates to a method of operating a radio frequency identification transponder.

BACKGROUND

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

SUMMARY

In accordance with a first aspect of the present disclosure, a radio frequency identification (RFID) transponder is provided, comprising a modulator and a controller, wherein: the modulator is configured to generate a modulated signal to be transmitted to an external RFID reader; the controller is configured to regulate an input voltage for the modulator, resulting in a regulated input voltage, and to feed said regulated input voltage to the modulator.

In one or more embodiments, the controller is configured to regulate the input voltage in dependence on a power indicator, said power indicator being indicative of an amount of power available in the RFID transponder.

In one or more embodiments, the controller is configured to regulate the input voltage in dependence on at least one of: an operating mode of the RFID transponder, an application domain in which the RFID transponder is used, a configuration of the RFID transponder, and parameters stored in the RFID transponder.

In one or more embodiments, the controller is configured to control a voltage level translator, wherein said voltage level translator is configured to combine the regulated input voltage with a modulator control signal, to generate a regulated control signal for the modulator.

In one or more embodiments, the modulator comprises an n-channel metal-oxide semiconductor (NMOS) switch, and said input voltage is the gate voltage of said NMOS switch.

In one or more embodiments, the RFID transponder further comprises a shunt regulator, wherein the controller is configured to use an output of said shunt regulator for regulating the gate voltage.

In one or more embodiments, the RFID transponder further comprises a current mirror, wherein said current mirror is configured to generate the gate voltage.

In one or more embodiments, the controller is configured to sample the output of the shunt regulator before the RFID transponder enters into a modulation phase.

In one or more embodiments, the RFID transponder is an RFID tag or an RFID card.

In accordance with a second aspect of the present disclosure, a method of operating a radio frequency identification (RFID) transponder is conceived, the RFID transponder comprising a modulator and a controller, the method comprising: the controller regulates an input voltage for the modulator, resulting in a regulated input voltage, and feeds said regulated input voltage to the modulator; the modulator generates a modulated signal to be transmitted to an external RFID reader.

In one or more embodiments, the controller regulates the input voltage in dependence on a power indicator, said power indicator being indicative of an amount of power available in the RFID transponder.

In one or more embodiments, the controller regulates the input voltage in dependence on at least one of: an operating mode of the RFID transponder, an application domain in which the RFID transponder is used, a configuration of the RFID transponder, and parameters stored in the RFID transponder.

In one or more embodiments, the controller controls a voltage level translator, wherein said voltage level translator combines the regulated input voltage with a modulator control signal, to generate a regulated control signal for the modulator.

In one or more embodiments, the modulator comprises an n-channel metal-oxide semiconductor (NMOS) switch, and said input voltage is the gate voltage of said NMOS switch.

In one or more embodiments, the RFID transponder further comprises a shunt regulator, and the controller uses an output of said shunt regulator for regulating the gate voltage.

DESCRIPTION OF DRAWINGS

Embodiments will be described in more detail with reference to the appended drawings, in which:

FIG. 1 shows an illustrative embodiment of an RFID transponder;

FIG. 2 shows an illustrative embodiment of a method of operating an RFID transponder;

DESCRIPTION OF EMBODIMENTS

Figure 3:
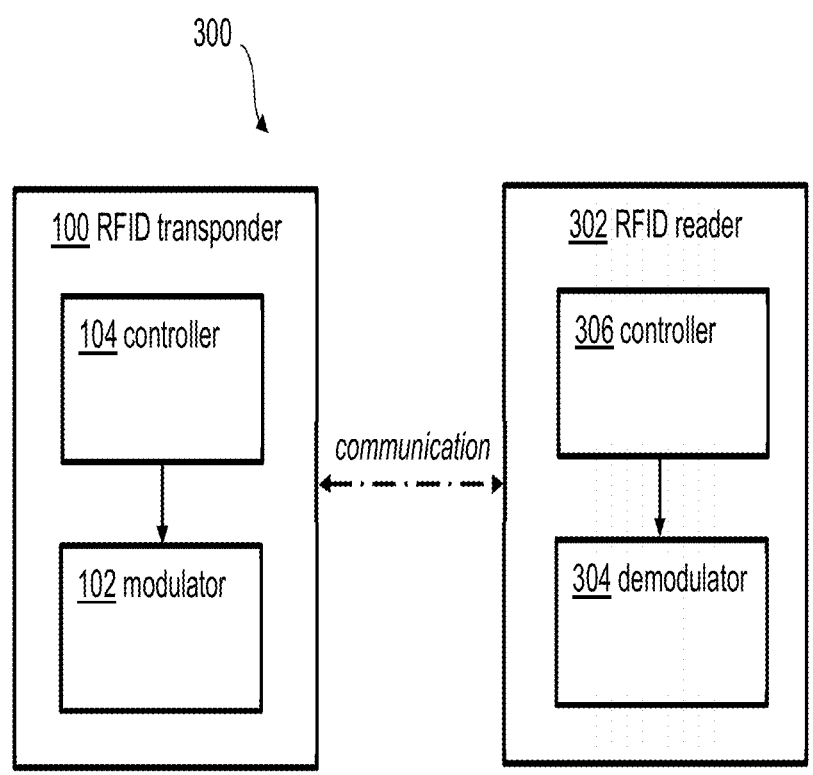
FIG. 3 shows an illustrative embodiment of a communication system.

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

RFID communication may be based on inductive coupling. The communication between an RFID reader and an RFID transponder, such as an RFID tag, is often realized by means of load modulation and can be split into a forward link and a return link. More specifically, the RFID reader may transmit commands to the RFID transponder through a forward link, and the RFID transponder may transmit responses to those commands back to the RFID reader through a return link. The RFID transponder contains a modulator, which load modulates a carrier signal. Different types of load modulation exist, for example active load modulation (ALM) and passive load modulation (PLM). The return link may also be referred to as a backscatter signal or more concisely as "backscatter".

In RFID applications the return link is an important parameter. In RFID transponders this backscatter is generated by a modulator, which includes one or more modulation transistors. The voltage that drives this modulator typically has a fixed level or a fixed voltage domain, and therefore the backscatter strength is defined. However, the different applications of RFID often require different backscatter strengths. Such application-related requirements are often defined in regulations issued by regulatory authorities. Since these requirements may also be subject to change, the backscatter strength of an RFID transponder should be easily adjustable. Furthermore, it would be advantageous if an RFID transponder can be used for various applications, and not only for a single application or a limited number of applications. Also for this reason, the backscatter strength of an RFID transponder should be easily adjustable. Adjusting the backscatter strength of an RFID transponder typically requires that the modulator is changed. However, it may be difficult and costly to change the modulator. Now discussed are an RFID transponder and a corresponding method of operating an RFID transponder, which facilitate adjusting the backscatter strength.

FIG. 1 shows an illustrative embodiment of a radio frequency identification (RFID) transponder. The RFID transponder 100 includes a modulator 102 controlled by a controller 104. The modulator 102 is configured to generate a modulated signal to be transmitted to an external RFID reader (not shown). Furthermore, the controller 104 is configured to regulate an input voltage for the modulator, which results in a regulated input voltage. Furthermore, the controller 104 is configured to feed the regulated input voltage to the modulator. In this way, the strength of the return link can easily be adjusted.

FIG. 2 shows an illustrative embodiment of a method 200 of operating an RFID transponder. The method 200 comprises the following steps. At 202, a controller regulates an input voltage for a modulator and feeds the regulated input voltage to the modulator. Furthermore, at 204, the modulator generates a modulator signal to be transmitted to an external RFID reader. In this way, the strength of the return link can easily be adjusted.

FIG. 3 shows an illustrative embodiment of an RFID communication system 300 in which the RFID transponder 100 is used. The communication system 300 comprises an RFID transponder 100 of the kind set forth and an RFID reader 302 which communicate with each other. The RFID transponder 100 includes the modulator 102 which is controlled by the controller 104. Similarly, the RFID reader 302 includes a demodulator 304 which is controlled by a controller 306. In operation, the RFID transponder 100 modulates a carrier wave generated by the RFID reader 302, resulting in a modulated signal, and transmits the modulated signal to the RFID reader 302. The RFID reader 302 receives said modulated signal and demodulates it using the demodulator 304. In accordance with the present disclosure, the controller 104 is configured to regulate an input voltage for the modulator, which results in a regulated input voltage. Furthermore, the controller 104 is configured to feed the regulated input voltage to the modulator.

In an embodiment, the controller is configured to regulate the input voltage in dependence on a power indicator, wherein said power indicator is indicative of an amount of power available in the RFID transponder. Thus, according to the available power, the backscatter strength may be adapted to fulfil national regulations, by changing the voltage used to control the modulator. To reduce the backscatter strength, a lower input voltage may be fed to the modulator. On the other hand, if the available amount of power is low, then the backscatter strength may be increased to increase the system performance. To increase the backscatter strength, a higher input voltage may be fed to the modulator. Thus, in this context, voltage regulation refers to an adjustment of the input voltage of the modulator.

In an embodiment, the controller is configured to regulate the input voltage in dependence on an operating mode of the RFID transponder. For example, the operating mode may be a production mode, a certification mode, and an application mode of the RFID transponder. In this way, the backscatter strength can easily be adjusted to accommodate different operating conditions of the RFID transponder. Furthermore, in an embodiment, the controller is configured to regulate the input voltage in dependence on an application domain in which the RFID transponder is used. In this way, the backscatter strength can easily be adjusted to meet specific application-related requirements. In a further embodiment, the controller is configured to regulate the input voltage in dependence on a configuration of the RFID transponder. In this way, the backscatter strength can easily be adjusted in accordance with the configuration of the RFID transponder. For example, the configuration may be a setting that sets the modulator in one of the available operating modes. This setting may be stored in a memory of the RFID transponder. In a further embodiment, the controller is configured to regulate the input voltage in dependence on parameters stored in the RFID transponder. For example, the application domain and the configuration are parameters which may be stored in the RFID transponder. This enables an easy update of the parameters, which in turn results in an easy reconfiguration of the RFID transponder and/or the possibility of reusing the RFID transponder in another application domain.

Figure 4:
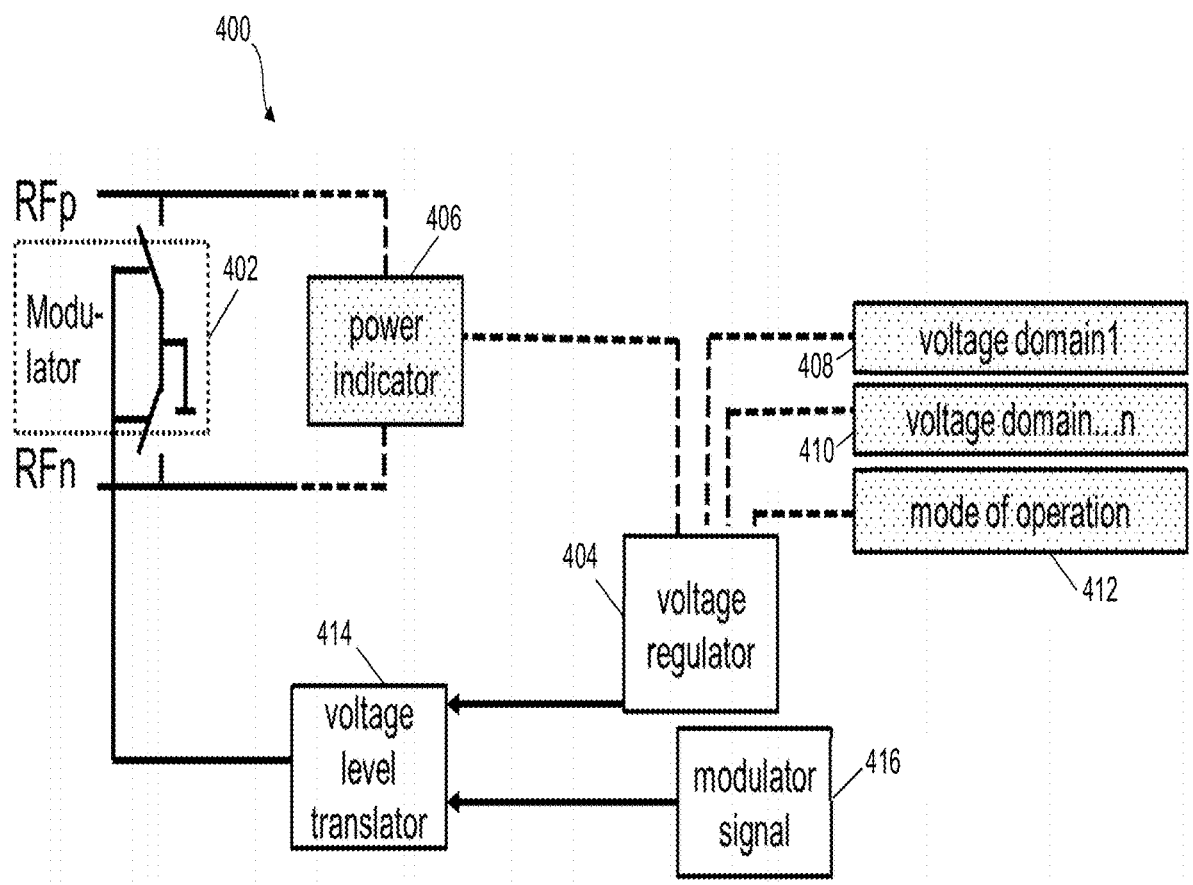
FIG. 4 shows another illustrative embodiment of an RFID transponder.

FIG. 4 shows another illustrative embodiment of an RFID transponder 400. In particular, an example is shown of an implementation of the RFID transponder shown in FIG. 1. The RFID transponder 400 comprises a modulator 402, a voltage regulator 404, a voltage level translator 414 and a plurality of voltage domains 408, 410. The voltage regulator 404 forms part of a controller of the kind set forth. Furthermore, the voltage level translator 414 may be controlled by a controller of the kind set forth. In some implementations, the voltage level translator 414 may also form part of the controller. In a practical and effective implementation, the voltage level translator 414 is configured to combine the regulated input voltage—i.e., the voltage output by the voltage regulator 404—with a modulator signal 416. This may be done by changing the amplitude of the modulator signal. It is noted that the voltage level translator may also be referred to as a level shifter. The modulator signal 416 may also be generated and provided by the controller. The output of the voltage level translator 414 is an adjusted modulator control signal, which depends on the input voltage provided by the voltage regulator 404. The adjusted modulator control signal is fed to the modulator. The voltage regulator 404 may regulate the input voltage for the modulator 402 in dependence on a power indicator 406 and/or a mode of operation 412. The power indicator may be indicative of the available amount of power in the RFID transponder, for example of the amount of power extracted from the field through RFp and RFn pins connected to the transponder's antenna (not shown). To regulate the input voltage for the modulator 402, the voltage regulator 404 may be connectable to different voltage domains 408, 410 (i.e., power domains). By connecting the voltage regulator 404 to a given voltage domain 408, 410, a predefined input voltage derived from that domain is applied to the voltage level translator 414. A voltage domain has a given voltage supply level, which may be output by a charge pump or which may be generated within the integrated circuit for supplying power to other components.

In one or more embodiments, the modulator comprises an n-channel metal-oxide semiconductor (NMOS) switch, and said input voltage is the gate voltage of said NMOS switch. This results in a practical and effective implementation of the modulator. Furthermore, in this way, the backscatter strength can easily be adjusted. In one or more embodiments, the RFID transponder further comprises a shunt regulator, and the controller is configured to use an output of said shunt regulator for regulating the gate voltage. The shunt regulator may be included in a contactless front-end of the RFID transponder. The output of the shunt regulator provides a suitable indication of the amount of power available in the RFID transponder. Thus, in this way, the input voltage can easily be regulated in dependence on the available amount of power. Furthermore, in one or more embodiments, the RFID transponder comprises a current mirror which is configured to generate the gate voltage. This results in a practical and effective implementation. Furthermore, in one or more embodiments, the controller is configured to sample the output of the shunt regulator before the RFID transponder enters into a modulation phase. In this way, as will be explained in more detail hereinbelow, it is ensured that the current can be mirrored during the modulation phase of the RFID transponder.

Figure 5:
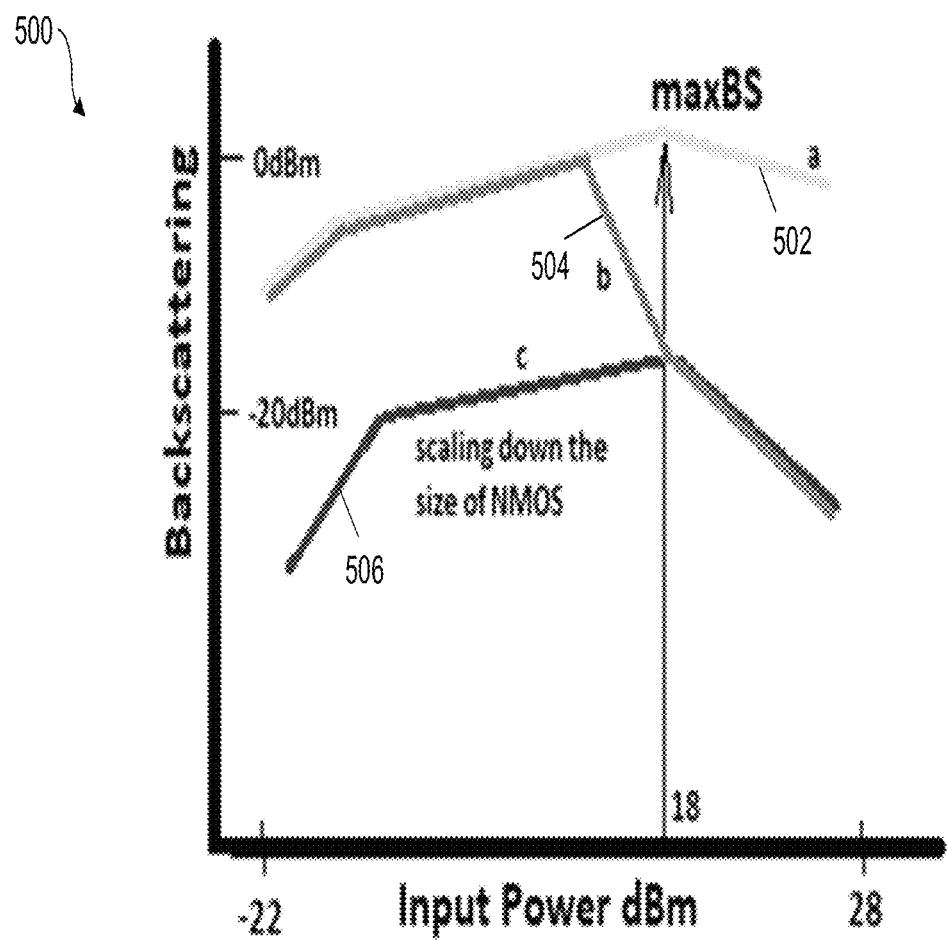
FIG. 5 shows examples of backscattering versus input power curves.

FIG. 5 shows examples of backscattering versus input power curves 500. During normal communication a transponder will typically be supplied with power through the field generated by the reader (which may also be referred to as an interrogator). This field is used to generate the local internal chip supply. The transponder typically responds to the reader by modulating this field, for example through a switch, which is usually an NMOS device. This process may also be referred to as backscattering. In this example, the strength of the backscatter depends on the gate voltage of the switch and the size of the switch. If the gate voltage is set to a maximum, then the strength of the backscatter will only be dependent on the size of this switch. As a result, the switch will have to be changed if the backscatter strength should be adjusted, for example to meet certain predefined requirements. In accordance with the present disclosure, the gate voltage of the NMOS switch may be varied in dependence on the strength of the input field. In this way, the backscatter strength may easily be adjusted. This may be necessary to meet requirements defined, for example, by the European Telecommunications Standards Institute (ETSI).

In order to meet ETSI requirements the backscatter strength and hence the electromagnetic interference (EMI) should be reduced at higher input power levels (for example −20 dBm at +18 dBm). In contrast, at low input powers levels (for example −22 dBm to 0 dBm) a maximum backscatter strength is required. With a constant gate voltage and size of the NMOS switch it is not possible to reduce the EMI at and above one point and achieve a maximum backscatter strength at lower input power levels.

This problem is illustrated in FIG. 5, wherein three curves are shown: a maximum backscattering versus input power curve 502, a backscattering versus input power according to predefined requirements curve 504 (i.e., a curve as should be achieved to meet predefined requirements such as the aforementioned ETSI requirements, and a backscattering versus input power curve after scaling down NMOS switch 506. In particular, to avoid negatively affecting the backscatter strength at lower input power levels it would be necessary to achieve curve 504. An adaptive control which is based on the strength of the input field facilitates achieving this curve.

Figure 6:
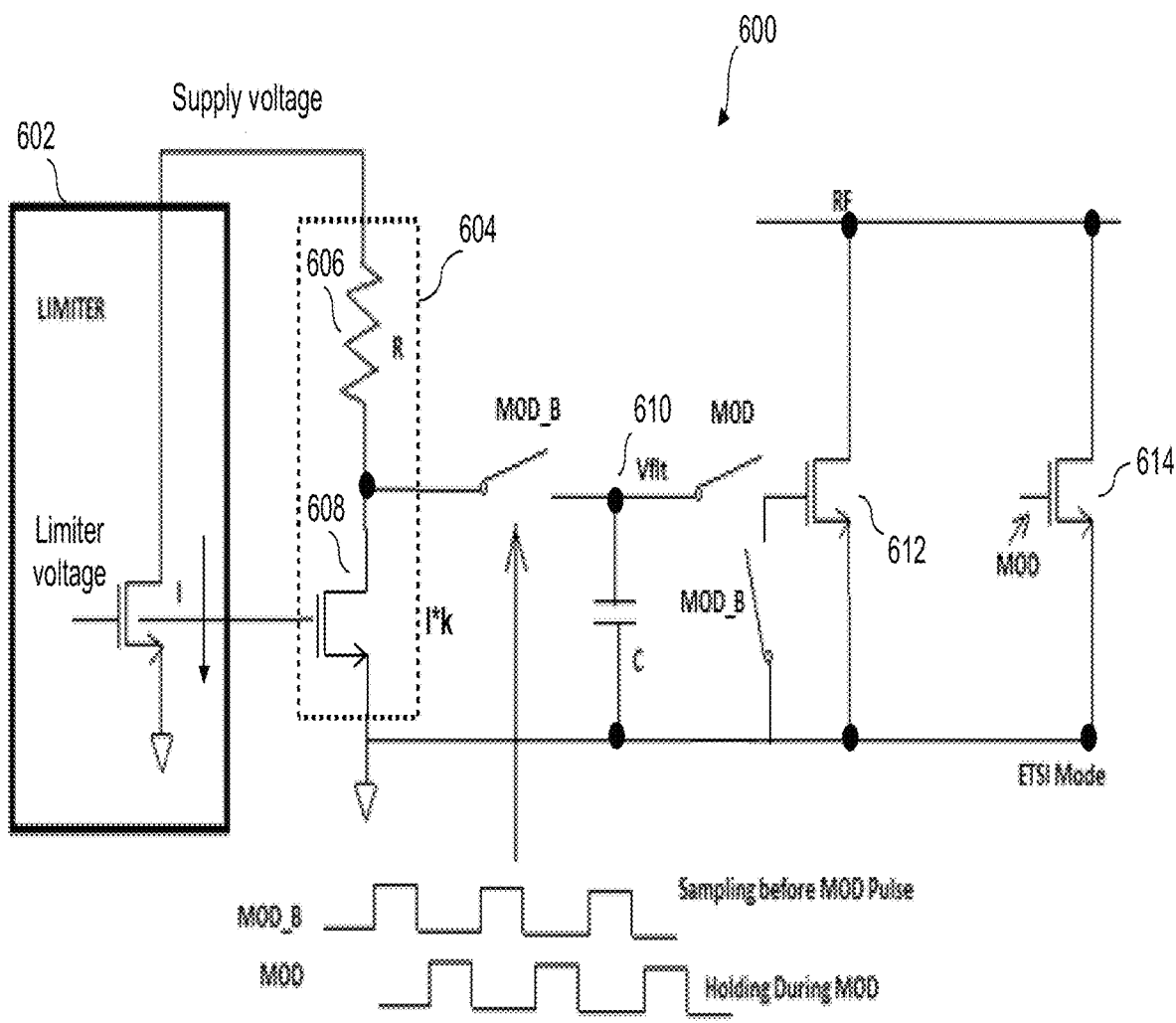
FIG. 6 shows an illustrative embodiment of an adaptive modulation concept.

FIG. 6 shows an illustrative embodiment of an adaptive modulation concept 600. The output of a shunt regulator 602 can be indicative of the strength of the input, more specifically of the amount of power available to the RFID transponder. The shunt regulator 602 may form part of a contactless front-end of the RFID transponder. The shunt regulator 602 is typically used to regulate the chip supply by shunting the excess current "I". Since the shunt current "I" has the characteristic that it increases proportionally with the input field strength, it is a suitable control parameter for an adaptive control of the kind set forth. Furthermore, a part of the shunt current can be mirrored by current mirror 608 to invert the characteristic using a resistor 606 to generate the gate voltage of the modulator switch 612. This inverted characteristic can be represented by the equation $Vg=VDDA-I*k*R$, where VDDA represents the internal chip supply, I represents the limiter current, k represents the scaling factor and R represents the bias resistor used to invert the characteristic.

As mentioned above, in one or more embodiments, the controller is configured to sample the output of the shunt regulator 602 before the RFID transponder enters into a modulation phase. In this way, it may be ensured that the current can be mirrored during the modulation phase of the RFID transponder. In particular, the limiter current goes down during modulation, because all the current is shunted by the modulator switches 612 and 614. This problem may be overcome by sampling this current (and hence the voltage) on a sampling capacitor 610 before the modulation phase and by using this sampled voltage to drive the gate of the switch 612.

In FIG. 6, when the signal MOD is high, modulation takes place. Before modulation, i.e. when MOD_B is high, the limiter 602 current (and hence the voltage) is sampled on the sampling capacitor 610. During this phase switch 612 does not conduct. During the modulation phase, i.e. when MOD_B is low and MOD is high, this sampled voltage is held by the sampling capacitor 610 and applied to the gate of the switch 612 which carries out the modulation. The minimum sampling capacitor size is determined by the instant charge to be provided to the parasitic gate capacitor of the switch 612 (and any logic in between, if any) and the longest modulation pulse duration. The maximum sampling capacitor is determined by the area limitation and time constant defined by sampling capacitor 610 and bias resistor 606 versus modulation period. Choosing a correct value of k and R can be used to achieve the ETSI specification at +18 dBm. For example, by choosing a gate voltage which is less than the threshold of the switch 612, the backscatter strength can be reduced at 18 dBm and above, where only the switch 614 stays active during modulation.

Figure 7:
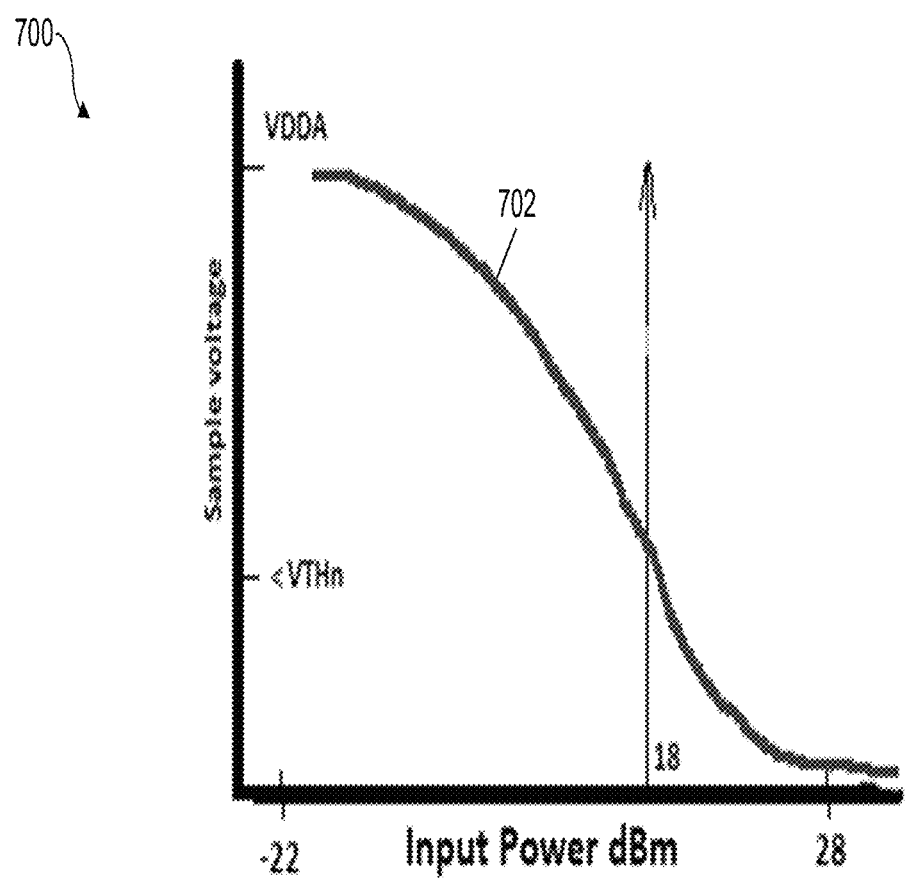
FIG. 7 shows an illustrative embodiment of a sampled gate voltage.

FIG. 7 shows an illustrative embodiment of a sampled gate voltage 700. In particular, a curve 702 is shown which represents the sampled gate voltage versus the input power. As shown, the sampled gate voltage is less than the threshold of the switch 612 (VTHn) at 18 dBm and above.

Figure 8:
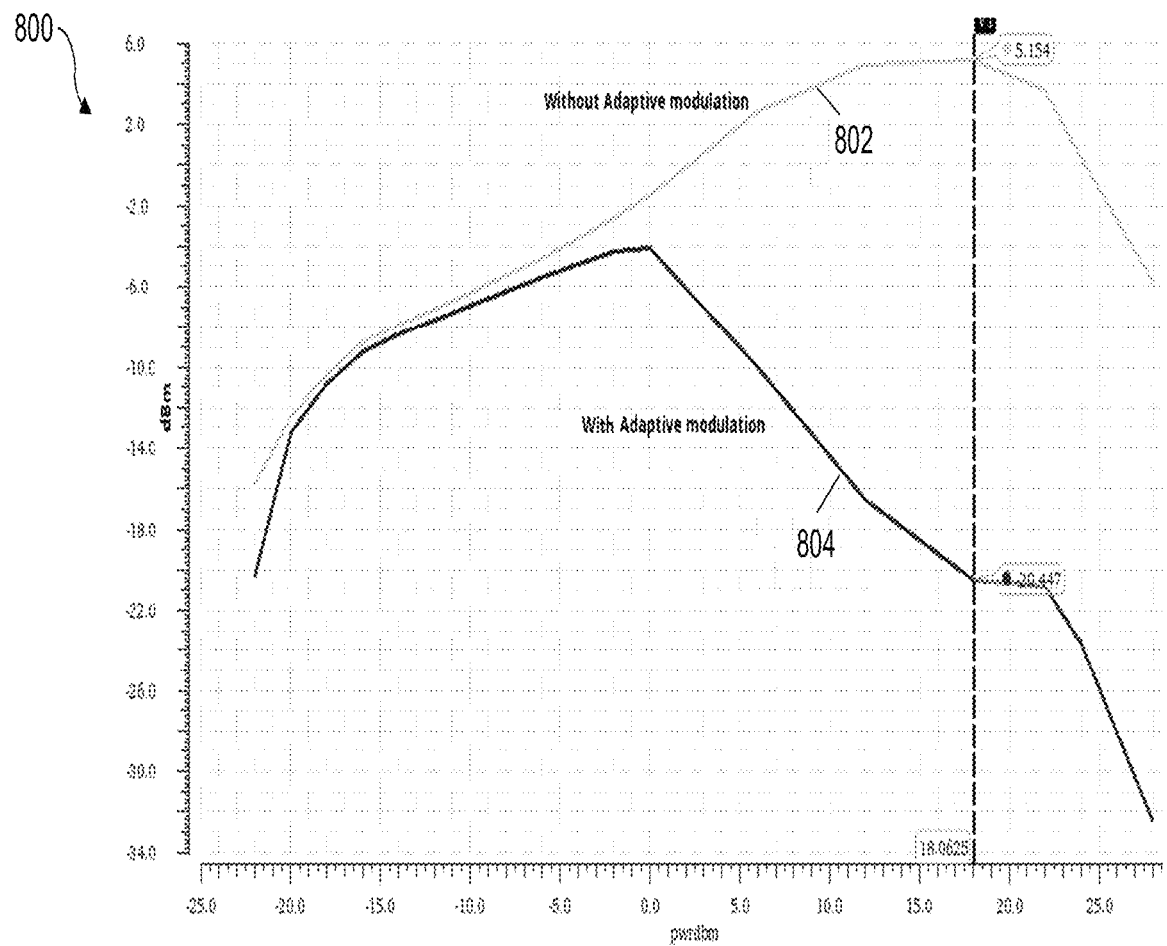
FIG. 8 shows examples of simulation results.

FIG. 8 shows examples of simulation results 800. In particular, curve 802 represents a simulation result without adaptive modulation, while curve 804 represents a simulation result with adaptive modulation in accordance with the present disclosure. As shown, curve 804 is similar to the desired curve 504 shown in FIG. 5. Thus, by using the adaptive modulation, predefined requirements (e.g., ETSI requirements) can be met.

Figure 9:
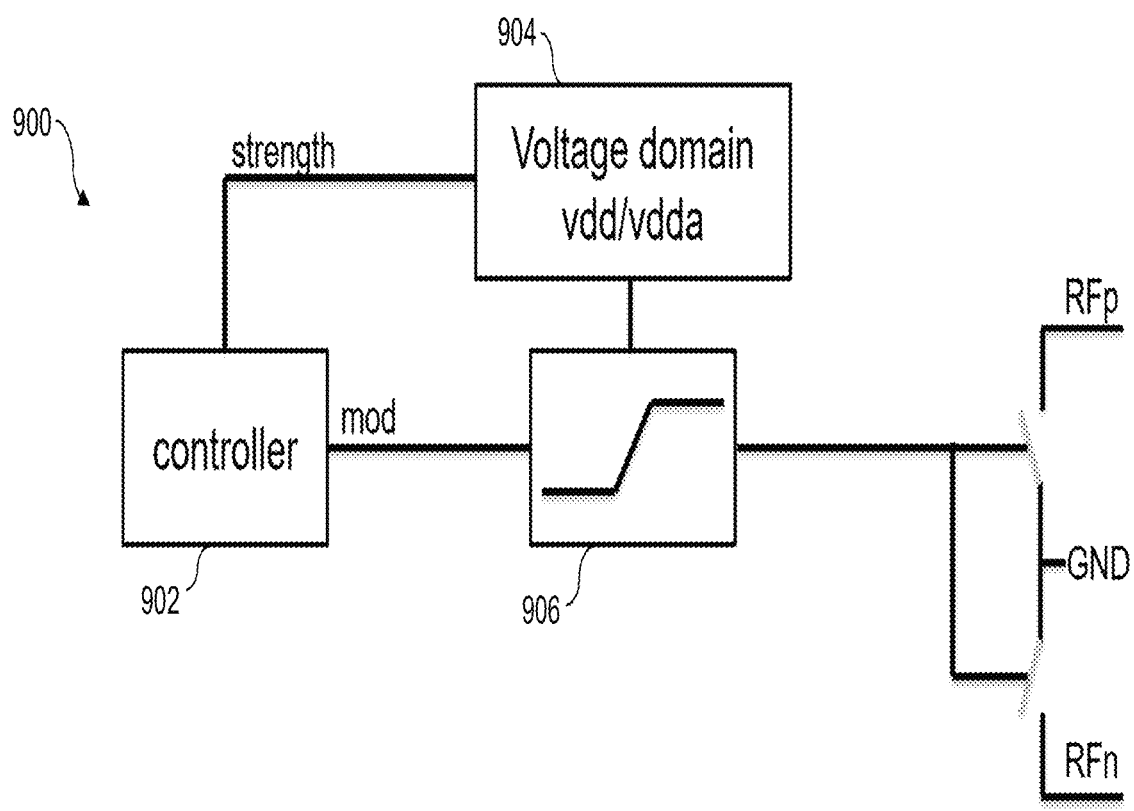
FIG. 9 shows a further illustrative embodiment of an RFID transponder.

FIG. 9 shows a further illustrative embodiment of an RFID transponder 900. The RFID transponder comprises a controller 902, a voltage domain 904 and a level shifter 906. In particular, FIG. 9 shows one possible implementation that uses a level shifter 906 (which may also be referred to as a voltage level translator) for changing the control voltage of the modulator. The controller 902 is configured to adjust the backscatter strength by switching the voltage domain 904 of said voltage level converter 906.

Figure 10:
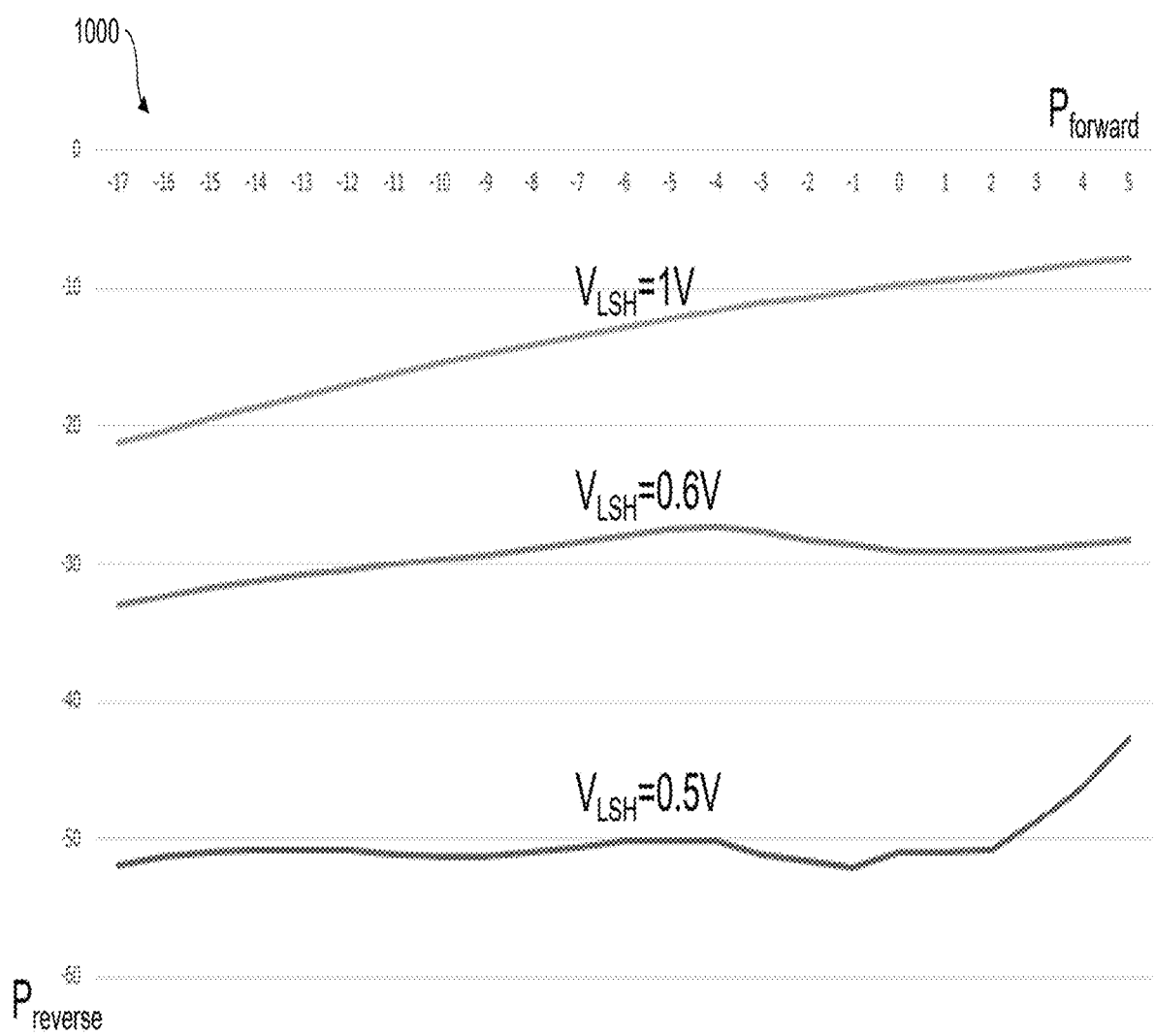
FIG. 10 shows a diagram which illustrates the impact of the changed level shifter voltage on the backscatter signal.

FIG. 10 shows a diagram 1000 which illustrates the impact of the changed level shifter voltage on the backscatter signal. In particular, FIG. 10 shows that the voltage level used by the level shifter can be used for changing the strength of the backscatter signal.

Figure 11:
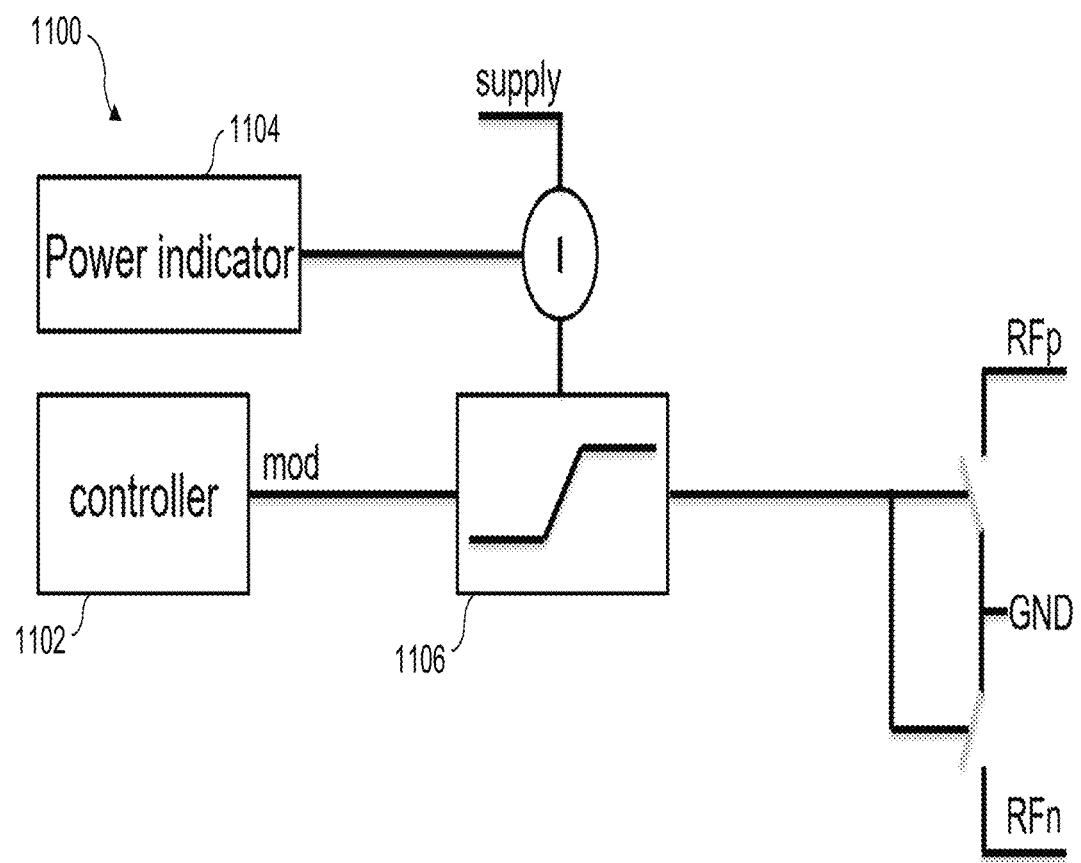
FIG. 11 shows a further illustrative embodiment of an RFID transponder.

FIG. 11 shows a further illustrative embodiment of an RFID transponder 1100. The RFID transponder 1100 comprises a controller 1102 and a level shifter 1106. In particular, FIG. 11 shows an implementation in which the level of the level shifter 1106 is changed using a power indicator 1104. This power indicator 1104 changes the voltage of the level shifter 1106 dynamically and adaptively, thereby also changing the strength of the backscatter signal.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID transponder
102 modulator
104 controller
200 method of operating an RFID transponder
202 controller regulates an input voltage for a modulator and feeds the regulated input voltage to the modulator
204 modulator generates a modulated signal to be transmitted to an external RFID reader
300 communication system
302 RFID reader
304 demodulator
306 controller
400 RFID transponder
402 modulator
404 voltage regulator
406 power indicator
408 voltage domain 1
410 voltage domain n
412 mode of operation
414 voltage level translator
416 modulator signal
500 backscattering versus input power
502 maximum backscattering versus input power
504 backscattering versus input power according to requirements
506 backscattering versus input power after scaling down NMOS switch
600 adaptive modulation concept
602 shunt regulator or limiter
604 inverter
606 bias resistor
608 current mirror
610 sampling capacitor
612 modulator switch
614 modulator switch
700 sampled gate voltage
702 sampled gate voltage versus input power
800 simulation results
802 simulation result without adaptive modulation
804 simulation result with adaptive modulation
900 RFID transponder
902 controller
904 voltage domain
906 level shifter 1000 impact of the changed level shifter voltage on the backscatter signal
1100 RFID transponder
1102 controller
1104 power indicator
1106 level shifter

The invention claimed is:

1. A radio frequency identification, RFID, transponder, comprising:
   a modulator configured to generate a modulated signal to be transmitted to an external RFID reader, the modulator comprising:
     a shunt regulator transistor and current mirror transistor coupled to provide a mirrored output in response to an input voltage;
     a first switch having a first terminal coupled to receive the mirrored output, and a second terminal, the first switch responsive to a first modulation signal;
     a sampling capacitor coupled to the second terminal of the first switch;
     a second switch having a first terminal coupled to second terminal of the first switch, and a second terminal, the second switch responsive to a second modulation signal; and
     a modulator transistor having a first terminal coupled to provide the modulated signal, a second terminal coupled to ground, and a gate coupled to the second terminal of the second switch.

2. The RFID transponder of claim 1 further comprising the first switch responsive to the first modulation signal before the RFID transponder enters into a modulation phase, and the second switch responsive to the second modulation during the modulation phase.

3. The RFID transponder of claim 1, wherein the modulator is configured to regulate the input voltage in dependence on at least one of: an operating mode of the RFID transponder, an application domain in which the RFID transponder is used, a configuration of the RFID transponder, and parameters stored in the RFID transponder.

4. The RFID transponder of claim 3, wherein the modulator is configured to control a voltage level translator, wherein said voltage level translator is configured to combine the regulated input voltage with a modulator control signal, to generate a regulated control signal for the modulator.

5. The RFID transponder of claim 1, wherein the RFID transponder is in an RFID tag or an RFID card.

6. A method of operating a radio frequency identification, RFID, transponder, the RFID transponder configured to generate a modulated signal to be transmitted to an external RFID reader, the method comprising:
   providing a mirrored output in response to an input voltage using a shunt regulator and a current mirror transistor;
   conducting the mirrored output to a sampling capacitor in response to a first modulation signal; and
   conducting a stored charge on the sampling capacitor in response to a second modulation signal to a gate of a modulator transistor to make the modulator transistor conductive, wherein the modulator transistor coupled between ground and a radio frequency antenna to provide the modulated signal.

7. The method of claim 6, further comprising regulating the input voltage in dependence on an amount of power available in the RFID transponder.

8. The method of claim 6 further comprising regulating the input voltage in dependence on at least one of: an operating mode of the RFID transponder, an application domain in which the RFID transponder is used, a configuration of the RFID transponder, and parameters stored in the RFID transponder.

9. The method of claim 8 further comprising controlling a voltage level translator, wherein said voltage level translator combines the regulated input voltage with a modulator control signal, to generate a regulated control signal for the modulator.

10. The method of claim 6, wherein conducting the mirrored output to a sampling capacitor in response to the first modulation signal occurs before the RFID transponder enters into a modulation phase, and conducting the stored charge on the sampling capacitor in response to a second modulation signal occurs during the modulation phase.

11. The method of claim 6, wherein the RFID transponder is an RFID tag or an RFID card.

* * * * *